(12) United States Patent
Uchijo et al.

(10) Patent No.: US 8,137,035 B2
(45) Date of Patent: Mar. 20, 2012

(54) CUTTING INSERT

(75) Inventors: Kenji Uchijo, Hyogo (JP); Yoshihiro Inoue, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 421 days.

(21) Appl. No.: 12/447,435

(22) PCT Filed: Aug. 31, 2007

(86) PCT No.: PCT/JP2007/067040
§ 371 (c)(1),
(2), (4) Date: Apr. 27, 2009

(87) PCT Pub. No.: WO2008/053633
PCT Pub. Date: May 8, 2008

(65) Prior Publication Data
US 2010/0067992 A1 Mar. 18, 2010

(30) Foreign Application Priority Data

Oct. 31, 2006 (JP) .................................. 2006-296614

(51) Int. Cl.
*B23B 27/22* (2006.01)
*B23B 27/04* (2006.01)
(52) U.S. Cl. .......................... 407/116; 407/115; 407/117
(58) Field of Classification Search .......... 407/113–117, 407/120, 100, 103
See application file for complete search history.

(56) References Cited

U.S. PATENT DOCUMENTS

| | | | | |
|---|---|---|---|---|
| 3,815,192 A * | 6/1974 | Ohtsu et al. | .................... | 407/114 |
| 4,214,845 A * | 7/1980 | Mori | ............................. | 407/114 |
| 4,487,534 A * | 12/1984 | Reiter | .......................... | 407/114 |
| 4,859,122 A * | 8/1989 | Patterson et al. | ............. | 407/114 |
| 5,040,930 A * | 8/1991 | Zinner | .......................... | 407/114 |
| 5,282,703 A * | 2/1994 | Itaba et al. | .................... | 407/114 |
| 5,628,590 A * | 5/1997 | Beeghly et al. | ............... | 407/114 |
| 5,758,994 A * | 6/1998 | Hintze et al. | .................. | 407/116 |
| 5,797,707 A * | 8/1998 | Stallwitz et al. | .............. | 407/114 |
| 5,921,722 A * | 7/1999 | Paya et al. | .................... | 407/114 |
| RE37,595 E * | 3/2002 | Lindstedt | ....................... | 407/116 |
| 6,692,199 B2 * | 2/2004 | Andersson et al. | ........... | 407/116 |
| 6,742,971 B2 * | 6/2004 | Tong | ............................. | 407/117 |
| 6,986,626 B2 * | 1/2006 | Gati | .............................. | 407/113 |
| 7,121,772 B2 * | 10/2006 | Krahula et al. | ............... | 407/113 |
| 7,458,753 B1 * | 12/2008 | Niebauer et al. | .............. | 407/113 |
| 7,976,251 B2 * | 7/2011 | Iyori et al. | .................... | 407/114 |
| 2008/0260476 A1 * | 10/2008 | Ishida | ............................ | 407/114 |
| 2009/0188356 A1 * | 7/2009 | Ishida | ............................... | 83/53 |
| 2010/0061815 A1 * | 3/2010 | Inoue | ............................ | 407/100 |

(Continued)

FOREIGN PATENT DOCUMENTS

JP 49-32279 3/1974
JP 64-56904 10/1989

(Continued)

*Primary Examiner* — Boyer D Ashley
*Assistant Examiner* — Sara Addisu
(74) *Attorney, Agent, or Firm* — DLA Piper LLP (US)

(57) ABSTRACT

A cutting insert includes a rake face region located on an upper surface, a flank located on a front surface, and a cutting edge located at an intersection between the rake face region and the flank. At least three types of projections having different distances from the cutting edge are on the rake face region. When these three types of projections are arranged in the order of increasing distance from the cutting edge, namely, a first projection, a second projection and a third projection, the top of the second projection is lower than an imaginary straight line connecting the top of the first projection and the top of the third projection in the side view.

23 Claims, 14 Drawing Sheets

U.S. PATENT DOCUMENTS

2010/0092253 A1 * 4/2010 Ishida .............................. 407/42

FOREIGN PATENT DOCUMENTS

| JP | 2-104904 | 8/1990 |
| JP | 08-071807 | 3/1996 |
| JP | 08-294803 | 11/1996 |
| JP | 2000-176708 | 6/2000 |
| JP | 2003-011005 | 1/2003 |
| JP | 2006-150584 | 6/2006 |
| JP | 2006-231458 | 9/2006 |

* cited by examiner (a)

(b)

(a)

(b)

(a)

(b)

US 8,137,035 B2

CUTTING INSERT

CROSS-REFERENCE TO THE RELATED APPLICATIONS

This application is a national stage of international application No. PCT/JP2007/067040 filed Aug. 31, 2007, which also claims the benefit of priority under 35 USC 119 to Japanese Patent Application No. 2006-296614 filed on Oct. 31, 2006, the entire contents of which are incorporated herein by reference.

The present invention relates to a cutting insert used for grooving in the turning process of metal materials and the like.

BACKGROUND ART

The cutting insert for grooving is required to permit a smooth discharge of chips generated. In order to improve the chip discharge property, various considerations have been conventionally given to the shape of the rake face of the cutting insert (for example, refer to Patent Document 1).

FIG. 21 is a partially enlarged schematic perspective view showing the neighborhood of one end of the related art cutting insert as described in the patent document 1. As shown in FIG. 21, a cutting insert 100 in the related art has, on the upper surface of the insert main body, a rake face 101, a clamp face 102 and an ascending portion (a descending portion) 103 formed into a slope shape from the rake face 101 toward the clamp face 102. A pair of first projections 105 and 105, which are arranged near a front cutting edge 104 and arranged laterally when viewed from the front cutting edge 104, are located on the rake face 101, and a second projection 106 is located posterior to the first projections 105 and 105 on the rear of the rake face 101.

When the grooving is carried out by using the cutting insert 100, firstly, the generated chips are previously curled by the first projections 105 and the second projection 106, and brought into a further dense coil shape and then broken and cut at the ascending portion 103. Thus, the chips caught by the cutting insert and the holder can be reduced to achieve smooth cutting.

Here, the sloped surface constituting the ascending portion 103 is configured so that the chips contact the ascending portion 103 and are curled upward and discharged. This enables effective chip breaking and cutting.

However, there has been a recent increase in materials having excellent ductility as a work material. When such a work material is subjected to the grooving using the cutting insert 100, the chips are hard to be broken and cut. Consequently, there has been the tendency that the curled chips are not discharged and liable to remain on the ascending portion 103.

Therefore, when the cutting insert 100 is used for internal turning in which for example, the inner surface of a tubular work material is subjected to grooving, the machining is carried out with the space over the rake face 101 closed. Hence the remaining chips will remain between the cutting insert 100 and the work material, so that the machined surface might be damaged and the cutting insert 100 might be damaged. When the chip curling on the rake face 101 is reduced to avoid the chips remaining at the ascending portion 103, the chips in the extended state graze the ascending portion 103. As a result, the chips are caught by the cutting insert 100 and the holder, so that the machined surface might be damaged and the cutting insert 100 and the holder might be damaged.

On the other hand, Patent Document 2 and Patent Document 3 disclose cutting inserts in which three types of projections having different distance from the cutting edge are arranged on the rake face. Specifically, in the cutting insert of Patent Document 2, the three types of projections are located so that their respective top portions are linearly arranged in the side view. In the cutting insert of Patent Document 3, the three types of projections are located so that the top portion of the projection having the second largest distance from the cutting edge is the highest among the top portions of the projections in the side view.

However, when the cutting insert of Patent Document 2 is used to perform the grooving of the above-mentioned work material having excellent ductility, the chips may slidingly pass through the top portions of the linearly arranged projections, and they ride on the ascending portion without being curled. When the cutting insert of Patent Document 3 is used to perform the grooving of the above-mentioned work material having excellent ductility, the chips may ride on the ascending portion without contacting the projection having the third largest distance from the cutting edge.

Consequently, in the cutting inserts disclosed in Patent Documents 2 and 3, the chips riding on the ascending portion may be caught by the cutting insert and the holder, thus damaging the machined surface.

Patent Document 1: Japanese Unexamined Utility Model Publication No. 64-56904
Patent Document 2: Japanese Unexamined Patent Publication No. 2000-176708
Patent Document 3: Japanese Unexamined Patent Publication No. 2006-150584

DISCLOSURE OF THE INVENTION

Problems to be Solved by the Invention

An advantage of the invention is to provide a cutting insert having excellent chip discharge property.

Means for Solving the Problems

In order to solve the above problem, the present inventors carried out intensive research to find the solution composed of the following configuration, thus leading to the completion of the present invention.

Specifically, the cutting insert according to the embodiment of the invention comprises a rake face region located on an upper surface, a flank located on a front surface, and a cutting edge located at an intersection between the rake face region and the flank. At least three types of projections having different distances from the cutting edge are located on the rake face region, and when the three types of projections are represented by a first projection, a second projection and a third projection in the order of their increasing distance from the cutting edge, the top portion of the second projection is located lower than an imaginary straight line connecting the top portion of the first projection and the top portion of the third projection in the side view.

The first projection, the second projection and the third projection preferably have tangent points to an imaginary circular arc in the side view, respectively.

The cutting tool for grooving comprises the cutting insert mounted on a holder.

The method of cutting a work material of the invention comprises rotating a work material, bringing the cutting tool near the work material, cutting the work material by bringing the cutting edge of the cutting tool into contact with the work material; and separating the cutting tool from the work material.

In the present invention, the term "rake face region" means a face region that substantially functions as a rake face in the upper surface of the insert, namely, a face region where chips graze.

The term "top portions" of the first to third projections means positions at which the individual projection dimensions is the maximum in the direction perpendicular to a reference surface being a holder mounting surface when the cutting insert is mounted on the holder.

The term "distance" from the cutting edge to the projection means a distance from the cutting edge to the top portion of the projection (including an error of ±0.1 mm) in the direction substantially perpendicular to the cutting edge in the plane view.

The term "imaginary circular arc" means a portion of the circumference of an imaginary circle having the center thereof above the rake face region.

Effect of the Invention

In accordance with the cutting insert according to the embodiment of the invention, when the first projection, the second projection and the third projection located on the rake face region are viewed from the side, the top of the second projection is located lower than the imaginary straight line connecting the top portion of the first projection and the top portion of the third projection. This produces the effect that even when a material having excellent ductility is machined, the generated chips can be stably curled and smoothly discharged by the interactions of these projections.

In accordance with the grooving tool according to the embodiment of the invention, the cutting insert is mounted on the holder, and hence the chips caught by the holder can be reduced to enable stable grooving over a long period of time.

In accordance with the method of cutting a work material according to the embodiment of the invention, the generated chips can be stably curled and smoothly discharged, thereby achieving an excellent machined surface.

PREFERRED EMBODIMENTS FOR CARRYING OUT THE INVENTION

Figure 1:
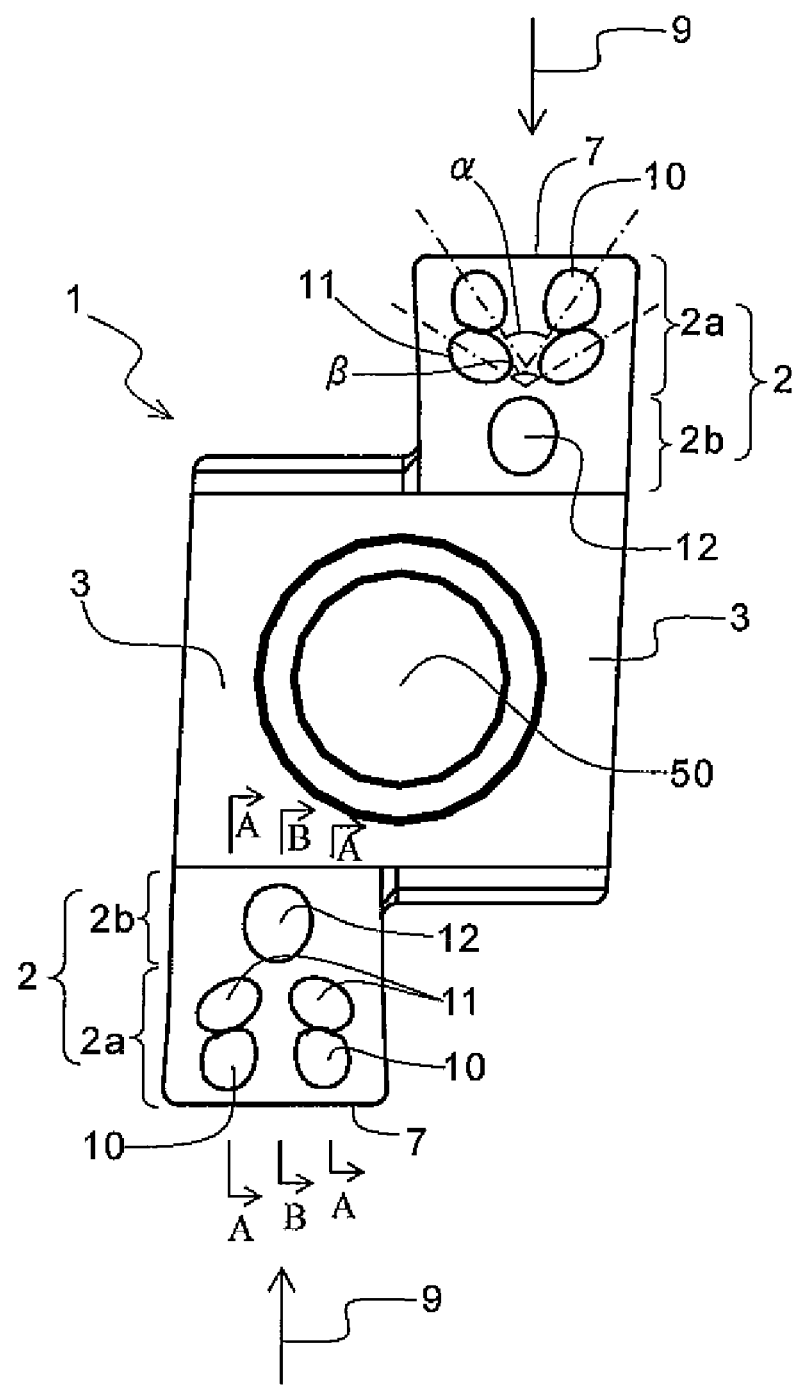
FIG. 1 is a plane view showing a cutting insert according to a preferred embodiment of the invention.
Figure 2:
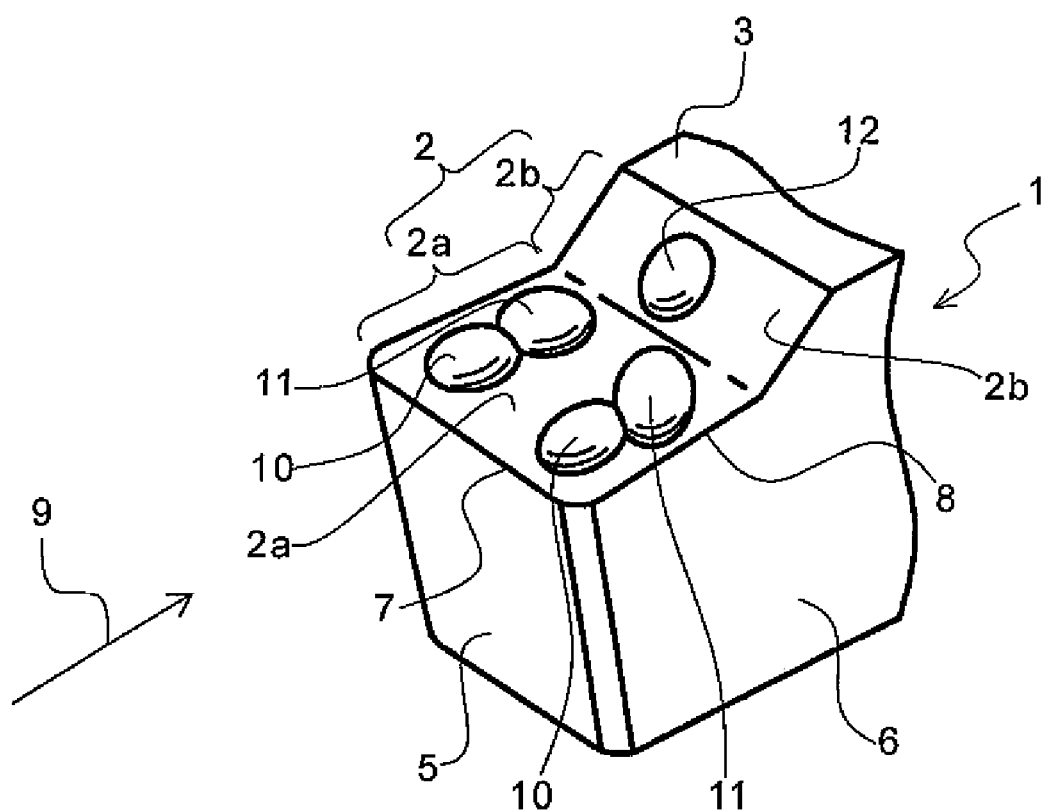
FIG. 2 is a partially enlarged schematic perspective view showing the neighborhood of one end of the cutting insert according to the preferred embodiment of the invention.
Figure 3:
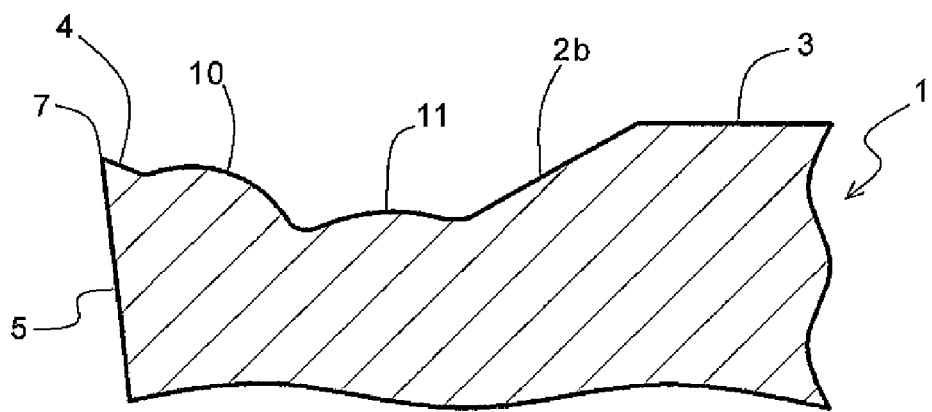
FIG. 3 is a diagram showing the broken surface taken along the line A-A in FIG. 1.
Figure 4:
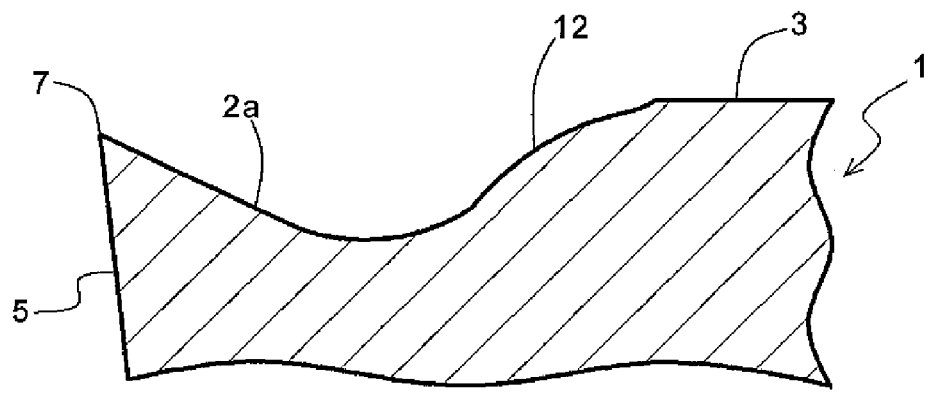
FIG. 4 is a diagram showing the broken surface taken along the line B-B in FIG. 1.

A preferred embodiment of the cutting insert according to the invention will be described in detail with reference to the accompanying drawings. FIG. 1 is a plane view showing a cutting insert according to the present preferred embodiment. FIG. 2 is a partially enlarged schematic perspective view showing the neighborhood of one end of the cutting insert according to the present preferred embodiment. FIG. 3 is a diagram showing the broken surface taken along the line A-A in FIG. 1. FIG. 4 is a diagram showing the broken surface taken along the line B-B in FIG. 1. FIGS. 5(a) and (b) are schematic explanatory drawings showing the states when the neighborhood of the rake face of the cutting insert of the present preferred embodiment is viewed from the side, respectively.

As shown in FIGS. 1 to 5, the cutting insert according to the present preferred embodiment (hereinafter referred to simply as an "insert") 1 comprises a rake face region 2, a clamp face region 3, a tip end flank 5, lateral flanks 6 and 6, a front cutting edge 7 and a lateral cutting edge 8 in both ends of an insert main body. The rake face region 2 and a clamp face region 3 are located on the upper surface. The tip end flank 5 is located at the front face of the tip end. The lateral flanks 6 and 6 are located on both side surfaces. The front cutting edge 7 is formed at the intersection between the rake face region 2 and the tip end flank 5. The lateral cutting edge 8 is formed at the intersection between the rake face region 2 and the lateral flanks 6. The rake face region 2 and the clamp face region 3 are arranged in this order from the front cutting edge 7 in the plane view.

The insert main body is constructed from one in which a sintered body, such as cemented carbide, cermet or ceramics, is coated with a hard film. The hard film is for improving the wear resistance and the fracture resistance of the insert 1, and examples of the composition thereof include titanium-based compounds such as titanium carbide, titanium nitride and titanium carbon nitride, and alumina. The hard film may be constructed from at least one layer or a plurality of layers. As the insert main body, without limiting to those coated with the hard film, those constructed from a sintered body, such as cemented carbide, cermet or ceramics, which are not coated with a hard film, may be used.

The clamp face region 3 is the region clamped by a later described holder 52, and a through-hole 50 is formed centrally of the clamp face region 3. The through-hole 50 is for fixing the insert 1 to the holder 52. The insert 1 has a 180-degree rotationally symmetrical shape with respect to the central axis of the through-hole 50. This is convenient because when one of the cutting edges in use is worn, the insert 1 can be rotated 180 degrees to use the other cutting edge not yet used.

The rake face region 2 has a rake face 2a and an ascending portion 2b formed so as to incline upward from the rake face 2a in the direction away from the front cutting edge 7. Specifically, the rake face 2a is inclined downward to the front cutting edge 7, and the clamp face region 3 is located higher in the thickness direction than the front cutting edge 7. The ascending portion (the descending portion) 2b is formed in a slope-shape from the rake face 2a toward the clamp face region 3. That is, the rake face 2a and the ascending portion 2b are formed so as to firstly descend and then ascend from the front cutting edge 7 toward the clamp face region 3 (refer to FIG. 3 and FIG. 4). This enables the generated chips to be curled along the rake face 2a, and brought into a coil shape at the ascending portion 2b and then discharged.

The sloped surface of the ascending portion 2b thus formed is configured so that the chips contact the ascending portion 2b and are curled upward and discharged, thus enabling the curled chips to be efficiently changed into a coil shape. Additionally, in the present preferred embodiment, the sloped surface of the ascending portion 2b is connected to the clamp face region 3.

In the present preferred embodiment, three types of projections 10, 11 and 12 having different distances from the front cutting edge 7 are located on the rake face region 2 as described above. When these three types of projections 10 to 12 are represented by the first projection 10, the second projection 11 and the third projection 12 in the order of their increasing distance from the front cutting edge 7, as shown in FIG. 5(a), a top portion t2 of the second projection 11 is located lower than an imaginary straight line S connecting a top portion t1 of the first projection 10 and a top portion t3 of the third projection 12 in the side view. As shown in FIG. 5(b), the first to third projections 10 to 12 have tangent points to an imaginary circular arc C in the side view, respectively.

When the first to third projections 10 to 12 are provided on the rake face region 2 under a specific arrangement, even when a material having excellent ductility is machined, the generated chips can be smoothly and stably curled, broken, cut and discharged by the interactions of the first to third projections 10 to 12 in a later described discharge step. Further, by adjusting the position of the top portion t2 of the second projection 11 with respect to the imaginary straight line S in the side view, the dimension of the imaginary circular arc C that the first to third projections 10 to 12 have tangent points to, and the back-and-forth positions of the first to third projections 10 to 12, the chip curvature and dimension can be controlled arbitrarily to enable an optimum machining according to the properties of a work material, the machining conditions and the like.

The imaginary circular arc C of the present preferred embodiment is a portion of the circumference of an imaginary circle having a center C1 above the rake face region 2. The radius of curvature (R) of the imaginary circular arc C, and the like are arbitrary unless they interfere with the practice of the present invention.

Here, the above-mentioned distances from the front cutting edge 7 to the first to third projections 10 to 12 are the distances from the front cutting edge 7 to the first to third projections 10 to 12 in the direction substantially perpendicular to the front cutting edge 7, respectively. Specifically, they can be calculated as distances (including an error of ±0.1 mm) from the front cutting edge 7 to the top portions t1 to t3 of the first to third projections 10 to 12, respectively, in the direction substantially perpendicular to the front cutting edge 7 in the plane view.

Figure 10:
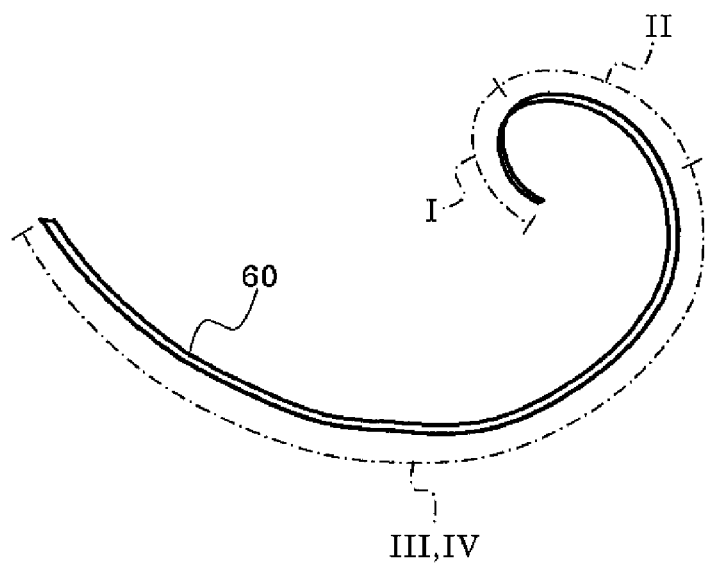
FIG. 10 is a schematic explanatory drawing showing an example of the discharged chips.

In the present preferred embodiment, the rake face region 2 comprises a flat surface 4 as a flat portion interposed between the front cutting edge 7 and the first projection (the projection most adjacent to the front cutting edge 7) 10. When the tangent point of the first projection 10 with the imaginary circular arc C is represented by "a", the "a" is within the range of one third from the front cutting edge 7 in the dimension of the rake face region 2 in the direction substantially perpendicular to the front cutting edge 7 in the plane view (refer to FIG. 3 and FIG. 5). Thus, so-called work hardening of the chips can occur considerably. That is, the sections of the chips after contacting the projections are transformed from a flat form to a narrow shape, causing the so-called work hardening that the chip hardness increases in proportion to the amount of transformation. With the above-mentioned specific arrangement of the flat surface 4 and the tangent point "a", the chips are pushed against the flat surface 4 and effectively compressed. The compressed chips are more susceptible to transformation by the first projection 10 so that the sections of the chips are changed from the flat shape to the narrow shape (such a shape that the width-direction dimension of the chips is further decreased). Hence, the work hardening of the chips can occur considerably, and the chips are liable to be broken and cut into a suitable length. As a result, the generated chips can be discharged by changing them into coil-shaped chips 60 having a small winding number, as shown in FIG. 10 described later, thereby having more excellent chip discharge property.

Particularly, it is preferable that the first projection 10 has a height of 0.1 mm or more so that the flat surface 4 has a length of 0.1 mm or more from the front cutting edge 7. This enables to suitably produce the above-mentioned effect. For the purpose of enhancing the above-mentioned effect, it is more preferable that the length of the flat surface 4 is substantially the same as the height of the first projection 10. No limit is imposed on the ratio of the area of the flat surface 4 in the rake face region 2, and the like, and they may be determined arbitrarily depending on the cutting conditions of the grooving and the like.

Figure 5:
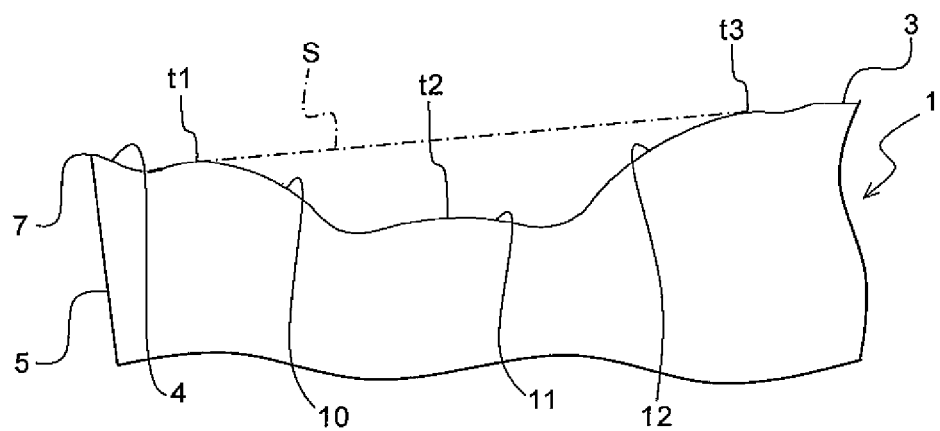
FIGS. 5(a) and (b) are schematic explanatory drawings showing the states when the neighborhood of the rake face of the cutting insert of the preferred embodiment of the invention is viewed from the side, respectively.
Figure 5:
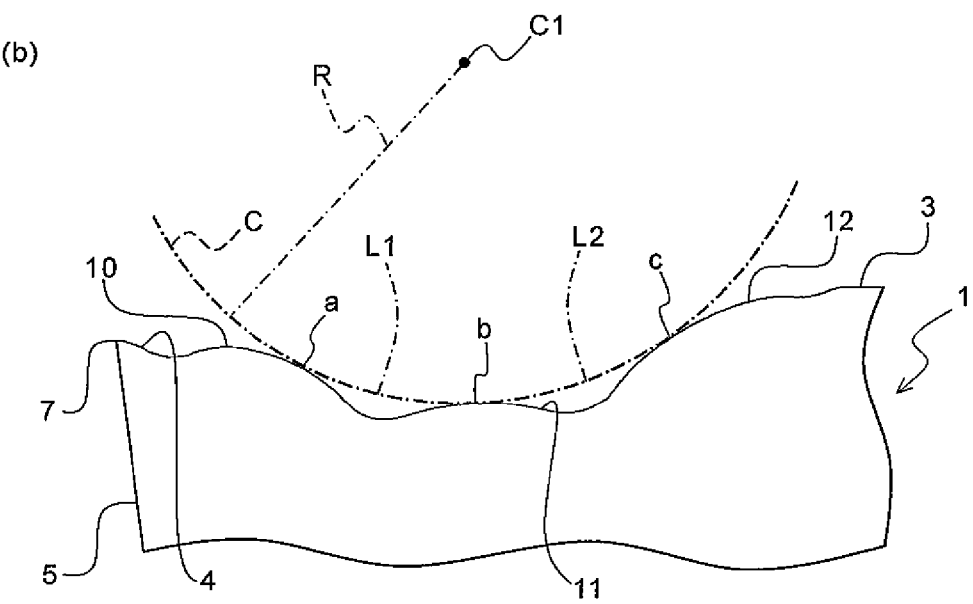

When the tangent point of the second projection 11 with the imaginary circular arc C is represented by "b", the tangent point of the third projection 12 with the imaginary circular arc C is represented by "c", a length L1 represents a curve length of the imaginary circular arc between these "a" and "b", and a length L2 represents a curve length of the imaginary circular arc between these "b" and "c", these L1 and L2 satisfy the relationship of $L1 \leq L2$ (see FIG. 5). That is, the case where these imaginary circular arc lengths L1 and L2 satisfy the above specific relationship is the case where the second projection 11 is arranged at the middle position between the first projection 10 and the third projection 12, or arranged adjacent to the first projection 10. When the first to third projections 10 to 12 are thus arranged, the interaction among these projections can be enhanced to enable the chips to be stably and suitably curled, broken, cut and discharged.

The central angle of the imaginary circular arc C between the tangent point "a" and the tangent point "c" is preferably 45 degrees to 150 degrees. For stabilizing the chip curl diameter and the like, the above central angle is more preferably 60 degrees to 120 degrees.

Here, in the front view, specifically, viewed from the front cutting edge 7 (indicated by an arrow 9 in FIG. 1 and FIG. 2), the first projection 10 comprises a pair of projections 10 and 10 arranged laterally on the rake face region 2. The second projection 11 comprises a pair of projections 11 and 11 arranged laterally on the rake face region 2 in the front view. Thus, the chips are liable to contact the projections, causing a greater amount of transformation of the chips and greater work hardening. As a result, the above-mentioned effect can be produced suitably, and the chip discharge property can be improved efficiently. Further, it is capable of improving the chip curling property on the rake face 2a, and causing considerable work hardening of the chips, so that the chips can be discharged in the coil shape having a smaller winding number.

A pair of the first projections 10 and 10 and a pair of the second projections 11 and 11 are formed in a substantially ellipsoidal body, namely a substantially semi-ellipsoidal body in the plane view. The third projection 12 is also formed in a substantially semi-ellipsoidal body. This stabilizes the contacts among the chips and the projections, achieving point contacts thereamong. Consequently, the chips can be moved smoothly over the projections, and the chip discharge direction can be stabilized to further improve the chip discharge property.

There is formed so that, in the plane view, an angle α between the major axes of the pair of the projections in the first projection 10 and 10 is smaller than an angle β between the major axes of the pair of the projections in the second projection 11 and 11 (refer to FIG. 1). Accordingly, the axis of the first projection 10 and the axis of the second projection 11 are shifted to widen the contact range among the projections and the chips. Therefore, the chips, whose section is changed from the flat form into the narrow shape by the first projection 10, can be stably slid onto the second projection 11, and the chip curvature can be controlled. As a result, the chips can be discharged in the coil shape having a smaller winding number.

The first and second projections 10 and 11 are formed continuously (namely so as to overlap each other) (refer to FIG. 1 and FIG. 2). This produces smooth movements of the generated chips among the first and second projections 10 and 11, and the chips can be fed smoothly to the ascending portion 2b. Alternatively, the first and second projections 10 and 11 may be arranged independently.

On the other hand, the third projection 12 is formed at the ascending portion 2b. Thus, the chips curled along the rake face 2a can contact the projection 12 at the ascending portion 2b, and therefore the area where the chips contact the ascending portion 2b can be decreased than the case where no projection is formed. That is, the frictional resistance of the chips at the ascending portion 2b can be decreased. Therefore, even when a material having excellent ductility is machined, the curled chips can be discharged by allowing them to smoothly graze along the ascending portion 2b without remaining at the ascending portion 2b.

The third projection 12 comprises a single projection formed at substantially the central position of the ascending portion 2b. This stabilizes the discharge direction of the chips curled along the rake face 2a, so that the chip discharge property can be improved efficiently. The position to locate the projection 12 is not limited to the above-mentioned position, and it may be a position adjacent to the right or the left of, or the upper side or the lower side of the ascending portion 2b.

The foregoing first to third projections 10 to 12 are summarized as follows. That is, the third projection 12 located at the ascending portion 2b comprises the single projection located at substantially the central position of the ascending portion 2b. The first and second projections 10 and 11 located on the rake face 2a comprise the pair of the first projections 10 and 10 arranged laterally, and the pair of the second projections 11 and 11 arranged laterally, in the front view, respectively. Thus, the generated chips are firstly transformed effectively by the pair of the first projections 10 and 10 along the rake face 2a. Then, the chips are supported by three points composed of the pair of the first projections 10 and 10 and the third projection 12, or the pair of the second projections 11 and 11 and the third projection 12, so that the chip discharge direction can be stabilized and the chips can be curled stably. Further, by arranging the three projections in the longitudinal direction so as to make the above specific arrangement, the chips, which the resistance due to the chip transformation is increased when the blade width of the cutting edge is large, are unsusceptible to curling action can be suitably curled at the third projection 12, making it possible to exhibit excellent chip discharge property.

As a method of forming the first to third projections 10 to 12 as described above, there are, for example, a method of forming them by sintering, followed by cutting and laser machining, and a method of integrally forming them in the molding step before sintering. As long as the top portion t2 of the second projection 11 is located to locate lower than the imaginary straight line S connecting the top portion t1 of the first projection 10 and the top portion t3 of the third projection 12 in the side view, the height, the width and the like of the first to third projections 10 to 12 are arbitrary, and they may be determined according to the grooving conditions and the like.

The above-mentioned insert 1 is applicable to both internal grooving (internal turning) and external grooving (external turning). For improving the usability of the present invention, the insert 1 is suitably used for internal turning in which the remaining chips are susceptible to clogging between the insert and a work material. As a work material, materials having excellent ductility are suitable. Examples thereof include austenitic stainless steel (such as SUS304) and chromium-molybdenum steel (such as SCM435). Among others, chromium-molybdenum steel is preferred.

Figure 6:
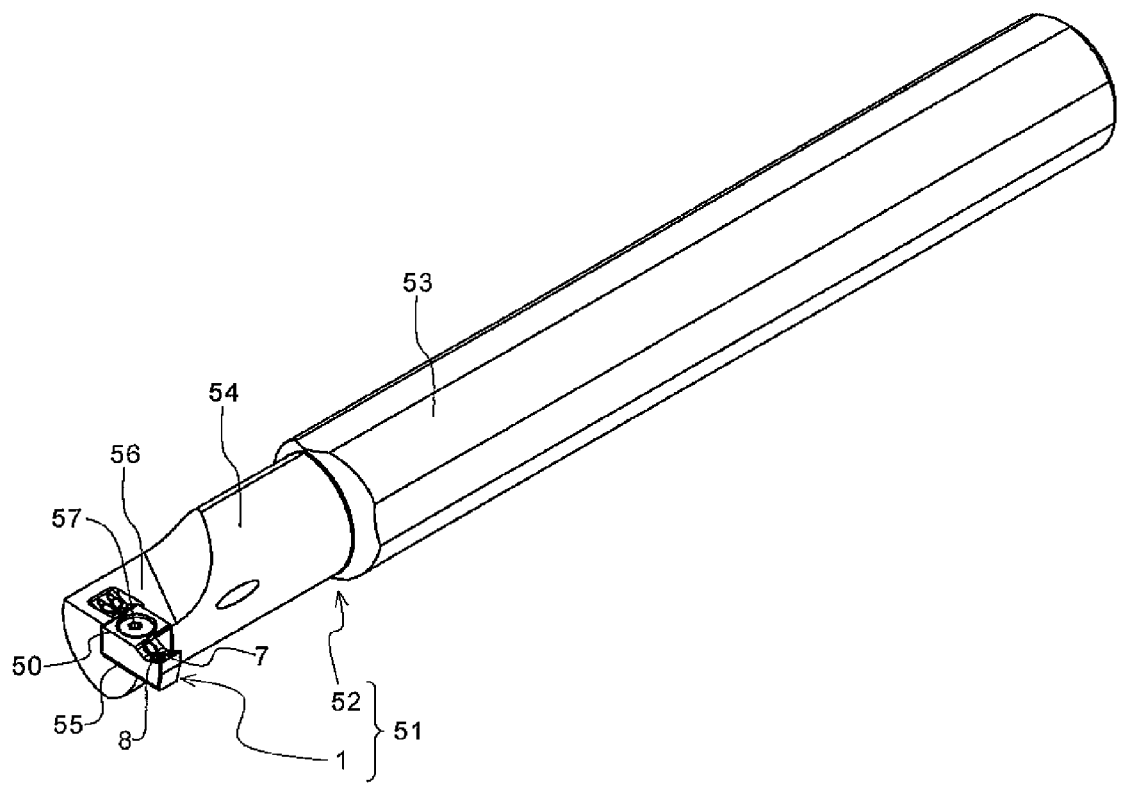
FIG. 6 is a perspective view showing a grooving tool according to a preferred embodiment of the invention.
Figure 7:
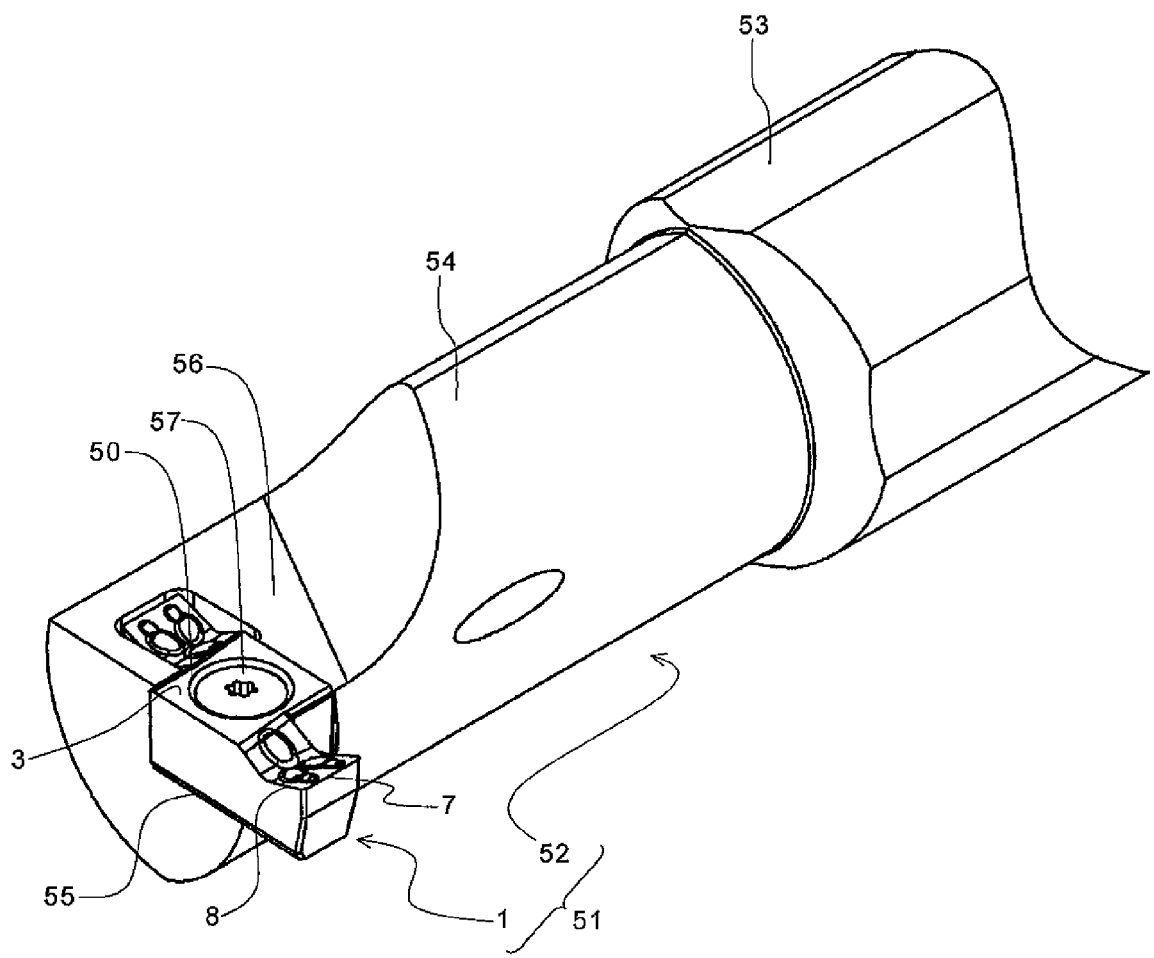
FIG. 7 is an enlarged perspective view showing the neighborhood of the tip end portion of the grooving tool shown in FIG. 6.

Next, a preferred embodiment of a tool for grooving with the insert 1 mounted thereon will be described in detail with reference to the accompanying drawings. FIG. 6 is a perspective view showing the tool for grooving according to the present preferred embodiment. FIG. 7 is an enlarged perspective view showing the neighborhood of the tip end of the tool for grooving shown in FIG. 6. As shown in FIG. 6 and FIG. 7, the tool for grooving according to the present preferred embodiment (hereinafter referred to simply as a "tool") 51 comprises the insert 1 mounted on the holder 52.

Specifically, the holder 52 comprises a support portion 53 secured onto an external equipment, and a tip end portion 54 comprising an insert mounting seat 55 onto which the insert 1 is screwed. The tip end portion 54 comprises a tip end upper surface 56 located lower than the clamp face region 3 of the insert 1. Thus, a chip discharge space can be ensured.

In the tool 51, a clamp screw 57 is inserted into a through-hole 50 of the insert 1, and the tip end of the clamp screw 57 is engaged into a screw hole (not shown) formed at the insert mounting seat 55 of the holder 52, so that the front cutting edge 7 and the lateral cutting edge 8 of the insert 1 project from the holder 52 toward one side. The tool 51 also has a front flank angle to avoid interference with a work material. Examples of the configuration that the tool 51 has a front flank angle include the configuration that the insert 1 having a front flank angle is mounted on the holder 52 so as to be parallel with the mounting surface of the holder 52, and the configuration that the insert 1 having no front flank angle is mounted on the holder 52 so as to be inclined to the mounting surface of the holder 52.

A method of cutting a work material using the tool 51 includes the following acts. That is, the method includes the act of rotating a work material, the act of bringing the tool 51 near the work material, the act of cutting the work material by bringing the front cutting edge 7 and the lateral cutting edge 8 into contact with the work material, and the act of separating the tool 51 from the work material. When the work material is cut through these acts by using the tool 51, the generated chips can be stably curled and smoothly discharged, achieving an excellent finished surface.

More specifically, when grooving is carried out by using the tool 51, owing to the insert 1 thus mounted, the generated chips can be smoothly and stably curled, broken, cut and discharged in the following discharge step. Therefore, the chips caught by the holder 52 can be reduced to enable stable grooving over a long period of time. Particularly, the tool 51 can also be used suitably in a small internal turning in which the chip discharge space is limited. Consequently, it is preferable to machine the internal surface of the work material in the step of cutting the work material.

Figure 8:
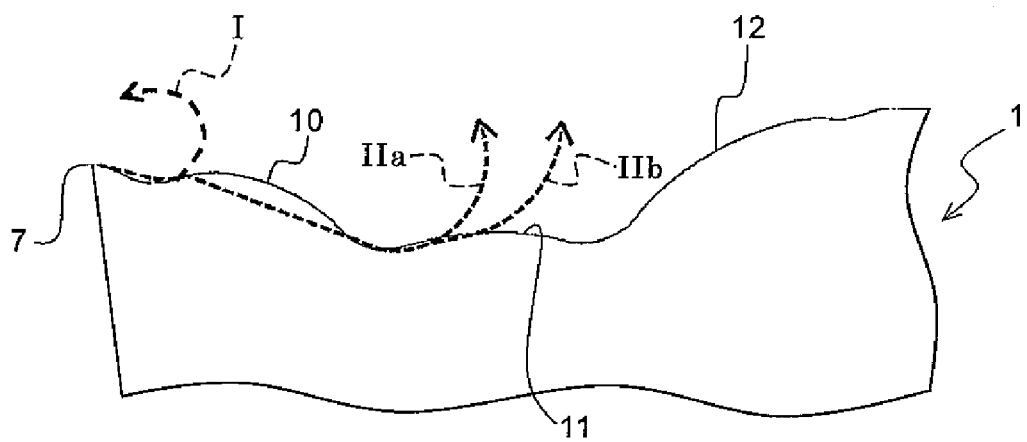
FIG. 8 is a schematic explanatory drawing showing the chip discharge step according to a preferred embodiment.
Figure 9:
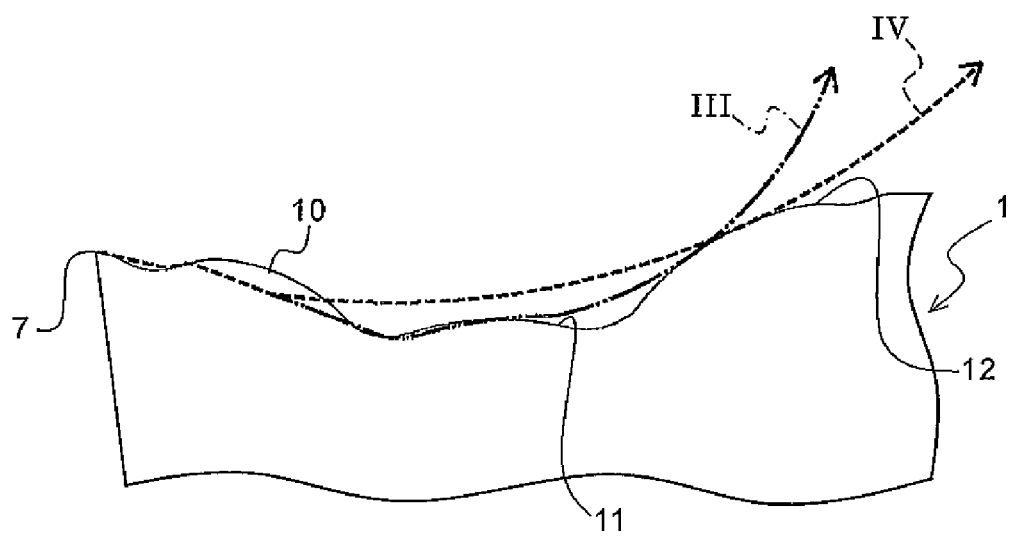
FIG. 9 is another schematic explanatory drawing showing the chip discharge step according to the preferred embodiment.

The step of discharging chips generated when grooving is carried out by using the tool 51 (namely the insert 1) will next be described in detail with reference to the drawings. FIG. 8 and FIG. 9 are schematic explanatory drawings showing the chip discharge step. FIG. 10 is a schematic explanatory drawing showing an example of the discharged chips. FIG. 8 and FIG. 9 show the states when the neighborhood of the rake face of the insert is viewed from the side, like FIG. 5, respectively.

As shown in FIG. 8, the chips generated by the grooving using the insert 1 firstly contact the pair of the projections 10 and 10, and they are narrowed and transformed and then locally compressed. Hereat, though the chips are not yet broken, they are bent and curled with a small curvature because considerable work hardening occurs (refer to an arrow I in FIG. 8, and a region I in FIG. 10).

The chips thus bent and curled as above then flow backward, and ride over the first projection 10, and contact the rear pair of the second projections 11 and 11 (refer to an arrow IIa in FIG. 8). The chips after contacting the second projection 11 are curled with a large curvature and continuously flow rearwardly of the second projection 11, while the curl starting point, namely, the contact point with the second projection 11 is gradually shifted to rearward so as to be apart from the cutting edge (refer to an arrow IIb in FIG. 8, and a region II in FIG. 10).

As shown in FIG. 9, the chips thus rode over the second projection 11 as above start to contact the third projection 12 located behind the second projection 11 (refer to an arrow III in FIG. 9, and a region III in FIG. 10). Immediately after contacting the third projection 12, the chips are separated from the second projection 11, and curled by the third projection 12, and also the contact point with the third projection 12 is shifted to a high portion of the third projection 12. As a result, the chips are curled with a larger curvature, and flow smoothly toward the rear (refer to an arrow IV in FIG. 9, and a region IV in FIG. 10).

Here, the chips are subjected to especially large work hardening action at the first projection 10. Therefore, for example, in the internal grooving, the chips are easily broken and cut upon receipt of such an external force that the chips contact the machined inner surface. Similarly, even in the external grooving, the chips are easily broken and cut in a proper length upon contact with the surface of a work material, and the like. As a result, the discharged chips become the coil-shaped chips 60 having a small winding number as shown in FIG. 10. It is therefore capable of reducing the cases where the chips caught between the insert 1 and the work material damage the machined surface, and the insert 1 and the holder 52 are damaged.

In the foregoing "front" means the feed direction during grooving, and the foregoing "rear" means the reverse direction (the direction opposite to the feed direction during grooving), namely the chip discharge direction.

Figure 11:
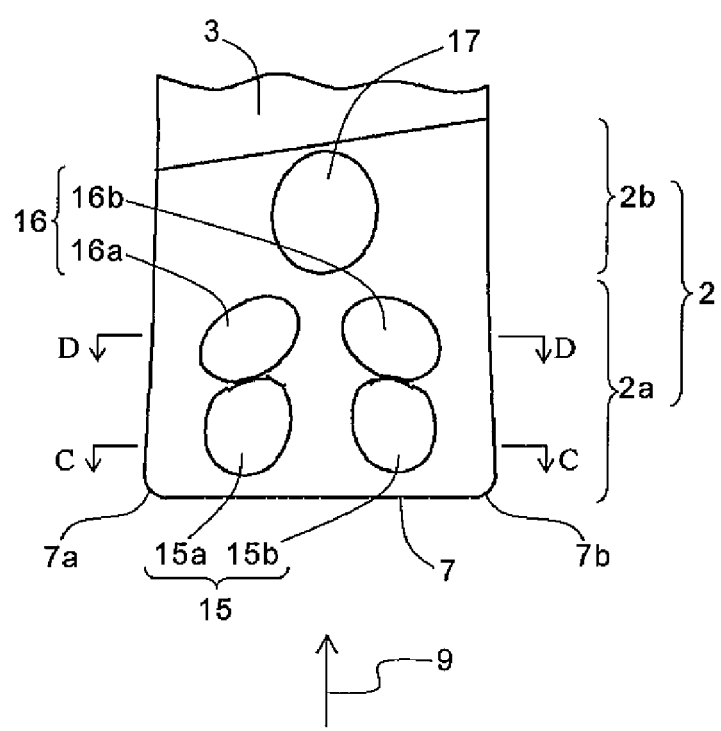
FIG. 11 is a partially enlarged schematic plane view showing the neighborhood of one end of a cutting insert according to other preferred embodiment of the invention.
Figure 12:
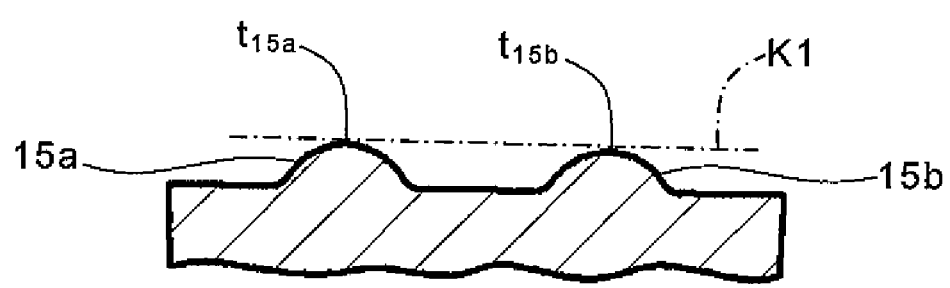
FIG. 12(a) is a diagram showing the broken surface taken along the line C-C in FIG. 11.
FIG. 12(b) is a diagram showing the broken surface taken along the line D-D in FIG. 11.
Figure 12:
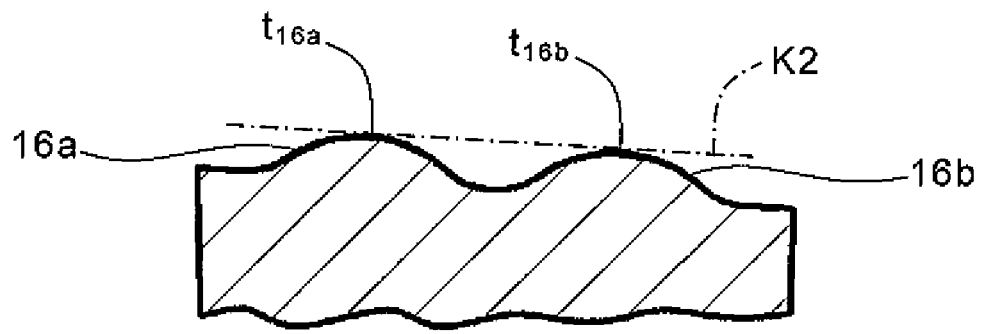

Other preferred embodiment according to the insert of the invention will next be described with reference to the accompanying drawings. FIG. 11 is a partially enlarged schematic plane view showing the neighborhood of one end of the insert according to the present preferred embodiment. FIG. 12(*a*) is a diagram showing the broken surface taken along the line C-C in FIG. 11, and FIG. 12(*b*) is a diagram showing the broken surface taken along the line D-D in FIG. 11. In FIG. 11 and FIG. 12, the same references have been used as in FIG. 1 to FIG. 10 for similar parts, and the description thereof is omitted.

Like the foregoing preferred embodiment, the insert of the present preferred embodiment comprises, on the rake face region 2, three types of projections 15, 16 and 17 having different distances from the front cutting edge 7, as shown in FIG. 11. When these three types of projections 15 to 17 are represented by the first projection 15, the second projection 16 and the third projection 17 in the order of their increasing distance from the front cutting edge 7, the top portion of the second projection 16 is located lower than an imaginary straight line connecting the top portion of the first projection 15 and the top portion of the third projection 17 in the side view. The first to third projections 15 to 17 have tangent points to an imaginary circular arc in the side view, respectively.

The first projection 15 comprises a pair of projections 15*a* and 15*b* arranged laterally on the rake face region 2 in the front view (indicated by an arrow 9 in FIG. 11). The second projection 16 comprises a pair of projections 16*a* and 16*b* arranged laterally on the rake face region 2 in the front view. The third projection 17 comprises a single projection located at substantially the central position of the ascending portion 2*b*.

In the present preferred embodiment, as shown in FIG. 12(*a*), the pair of the first projections 15*a* and 15*b* are located so that a top portion $t_{15a}$ of the projection 15*a* adjacent to one end 7*a* of the front cutting edge 7 is higher than a top portion $t_{15b}$ of the projection 15*b* adjacent to the other end 7*b* of the front cutting edge 7. As shown in FIG. 12(*b*), the pair of the second projections 16*a* and 16*b* are located so that a top portion $t_{16a}$ of the projection 16*a* adjacent to one end 7*a* of the front cutting edge 7 is higher than a top portion $t_{16b}$ of the projection 16*b* adjacent to the other end 7*b* of the front cutting edge 7.

Further, when an imaginary straight line connecting between the top portions $t_{15a}$ and $t_{15b}$ of the pair of the first projections 15*a* and 15*b* is represented by a line K1 and an imaginary straight line connecting between the top portions $t_{16a}$ and $t_{16b}$ of the pair of the second projections 16a and 16b is represented by a line K2, the tilt angle of the line K1 with respect to the front cutting edge 7 is smaller than the tilt angle of the line K2 with respect to the front cutting edge 7. When the pair of the first projections 15a and 15b and the pair of the second projections 16a and 16b are thus arranged, the generated chips can be discharged by changing them into helical shaped chips having a small winding number, thereby having excellent chip discharge property. Additionally, the discharge direction of the generated chips can be controlled so that they advance toward the other end 7b of the front cutting edge 7, thus enabling the generated chips to be stably discharged from the tip end of the holder 52 toward the support portion 53.

The rake face region 2 comprises a edge closer to the clamp face region 3. The edge of the rake face region 2 inclines so as to have an increasing distance from the front cutting edge 7, from the one end 7a of the front cutting edge 7 toward the other end 7b of the front cutting edge 7, in the plane view. This ensures a chip discharge space. Further, the chip discharge direction becomes a constant direction, so that the generated chips can be smoothly discharged from the tip end of the holder 52 toward the support portion 53.

The rake angle of the rake face region 2 increases from the one end 7a of the front cutting edge 7 toward the other end 7b of the front cutting edge 7. This enables the generated chips to be surely discharged as the helical shaped chips having a small winding number. That is, at the other end 7b of the front cutting edge 7, the generated chips have a smaller thickness and the chip generation speed becomes high. Therefore, the chips at the other end 7b of the front cutting edge 7 receive the curling action of the ascending portion 2b earlier than at the one end 7a of the front cutting edge 7. Thus, the chips are changed into the helical shape and then discharged stably toward the other end 7b of the front cutting edge 7 where a large chip discharge space is ensured. As a result, it is capable of reducing the cases where the chips are clogged within the machined groove and they damage the machined surface.

When the insert is mounted on the holder 52, the one end 7a of the front cutting edge 7 is located adjacent to the tip end of the holder 52, and the other end 7b of the front cutting edge 7 is located adjacent to the support portion 53 of the holder 52. Otherwise, the configuration is identical to that described in the forgoing preferred embodiment, and the description thereof is omitted.

Figure 13:
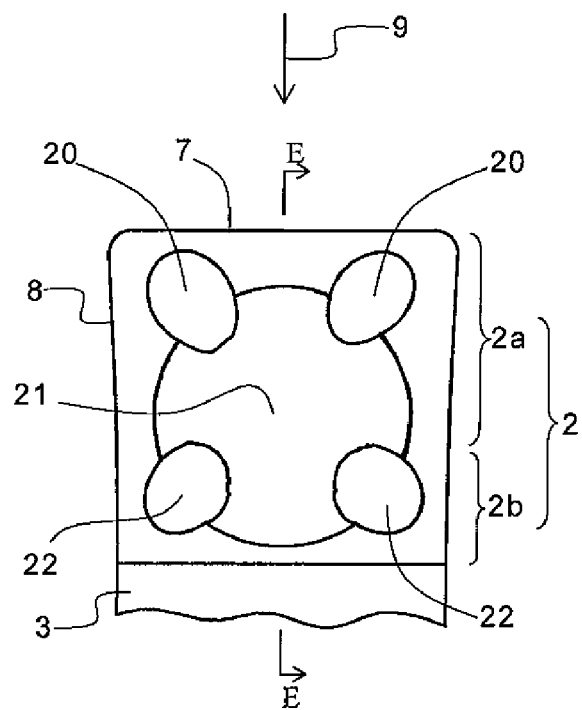
FIG. 13 is a partially enlarged schematic plane view showing the neighborhood of one end of a cutting insert according to a still other preferred embodiment of the invention.
Figure 14:
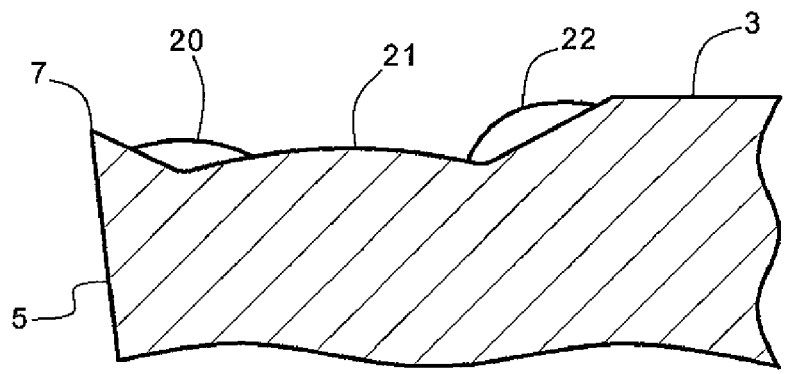
FIG. 14 is a sectional view taken along the line E-E in FIG. 13.

Next, a still other preferred embodiment according to the insert of the invention will be described in detail with reference to the accompanying drawings. FIG. 13 is a partially enlarged schematic plane view showing the neighborhood of one end of the insert according to the present preferred embodiment. FIG. 14 is a diagram showing the broken surface taken along the line E-E in FIG. 13. In FIG. 13 and FIG. 14, the same references have been used as in FIG. 1 to FIG. 12 for similar parts, and the description thereof is omitted.

Like the foregoing preferred embodiment, the insert of the present preferred embodiment comprises, on a rake face region 2, three types of projections 20, 21 and 22 having different distances from a front cutting edge 7, as shown in FIG. 13 and FIG. 14. When these three types of projections 20 to 22 are represented by the first projections 20, the second projection 21 and the third projections 22 in the order of their increasing distance from the front cutting edge 7, the top portion of the second projection 21 is located lower than an imaginary straight line connecting the top portion of the first projection 20 and the top portion of the third projection 22 in the side view. The first to third projections 20 to 22 have tangent points to an imaginary circular arc in the side view.

The first projection 20 located in the vicinity of the front cutting edge 7, and the third projections 22 located at an ascending portion 2b comprises a pair of substantially semi-ellipsoidal projections arranged laterally in the front view (indicated by an arrow 9 in FIG. 13), respectively. The second projection 21 of substantially semispherical shape located at substantially the central position of a rake face region 2 is larger than the first and third projections 20 and 22, and the first and third projections 20 and 22 are continuously formed with the second projection 21 interposed therebetween.

Even if the specific projections located on the rake face region 2 have the above configuration, the same effect as the foregoing preferred embodiment can be produced. Especially, by configuring so that the first projections 20 in the vicinity of the front cutting edge 7 comprise a pair of projections arranged laterally, the large work hardening of the chips can occur. By configuring so that the third projections 22 at the ascending portion 2b comprise a pair of projections arranged laterally, the chips curled along a rake face 2a are liable to contact the projections 22, and the chip discharge direction is stabilized, enabling the chip discharge property to be improved efficiently. Further, the first and third projections 20 and 22 are continuously formed with the second projection 21 interposed therebetween, and hence the chips can move smoothly among the projections, thereby producing the effect of having especially excellent chip discharge property.

The shapes of the first and third projections 20 and 22 are not limited to the substantially semi-ellipsoidal body, and they may have a semispherical shape or other shape. Similarly, the shapes of the second projections 21 are not limited to the substantial semispherical shape, and they may be shaped in a semi-ellipsoidal body or other shape. Otherwise, the configuration is identical to that described in the forgoing preferred embodiment, and the description thereof is omitted.

Figure 15:
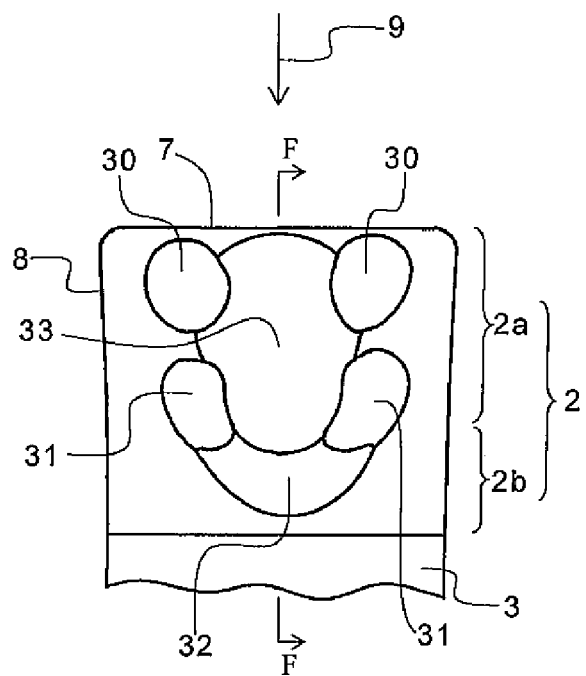
FIG. 15 is a partially enlarged schematic plane view showing the neighborhood of one end of a cutting insert according to a still other preferred embodiment of the invention.
Figure 16:
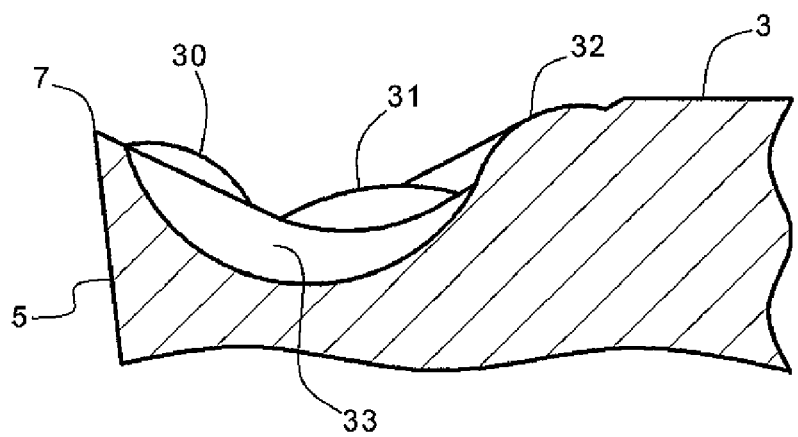
FIG. 16 is a sectional view taken along the line F-F in FIG. 15.
Figure 17:
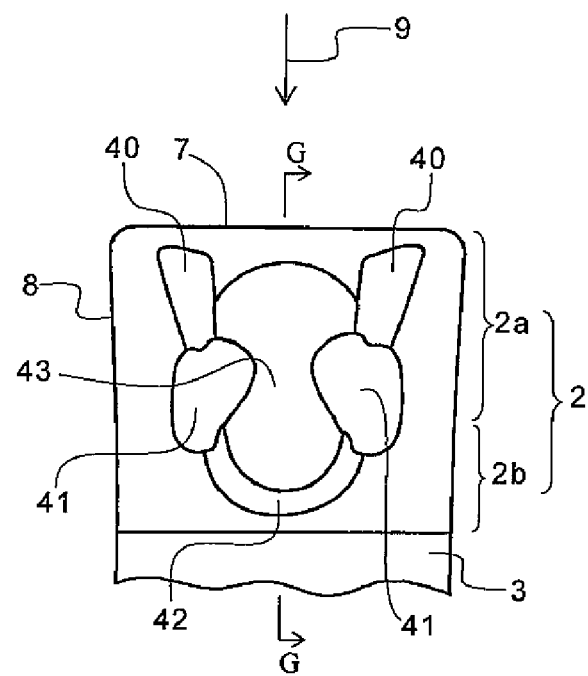
FIG. 17 is a partially enlarged schematic plane view showing the neighborhood of one end of a cutting insert according to a still other preferred embodiment of the invention.
Figure 18:
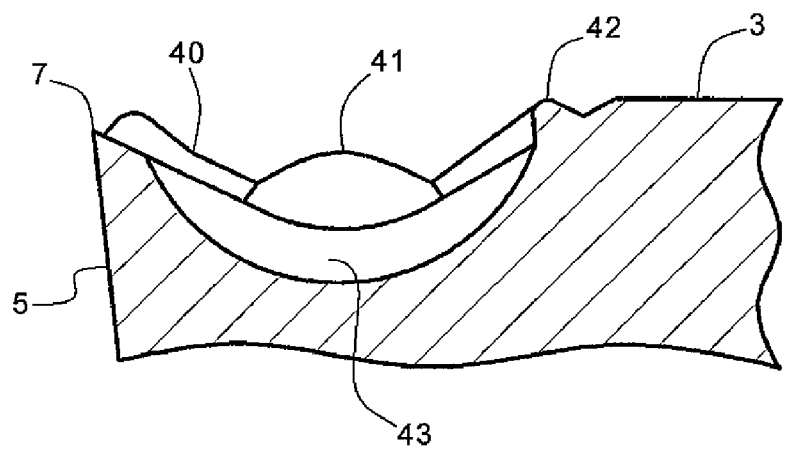
FIG. 18 is a sectional view taken along the line G-G in FIG. 17.

Next, a still other preferred embodiment according to the insert of the invention will be described in detail with reference to the accompanying drawings. FIG. 15 to FIG. 18 are diagrams showing the neighborhood of one end of the insert according to the present preferred embodiment. In these drawings, FIG. 15 and FIG. 17 are partially enlarged schematic plane views showing the neighborhood of the one end of the insert according to the present preferred embodiment. FIG. 16 is a sectional view taken along the line F-F in FIG. 15. FIG. 18 is a sectional view taken along the line G-G in FIG. 17. In FIG. 15 to FIG. 18, the same references have been used as in FIG. 1 to FIG. 14 for similar parts, and the description thereof is omitted.

In the insert of the present preferred embodiment, a concave portion is located in the region between a front cutting edge 7 and a third projection (the projection that is the most apart from the front cutting edge 7 among the above-mentioned three types of projections). Specifically, as shown in FIG. 15 and FIG. 17, the projections located on a rake face 2a comprise a pair of projections 30 and 30 arranged laterally, and a pair of projections 40 and 40 arranged laterally, in the front view (indicated by an arrow 9 in FIG. 15 and FIG. 17), which are located in the vicinity of the front cutting edge 7, and a pair of projections 31 and 31 arranged laterally, and a pair of projections 41 and 41 arranged laterally, in the front view, which are located behind the projections 30 and 40. The projections located on the sloped surface of an ascending portion 2b comprise imaginary circular arc shaped projections 32 and 42 formed so as to connect between the projections 31 and 31 and between the projections 41 and 41 in the plane view.

As shown in FIG. 15 to FIG. 18, concave portions 33 and 43 are located at the region between the front cutting edge 7 and the third projections (the projections that are the most apart from the front cutting edge 7) 32 and 42, namely, the region surrounded by the projections 30 to 32 and the projections 40 to 42. It therefore ewducable that the central portions of the chips contact the rake face 2a, and hence the frictional resistance can be decreased and the generated chips can be curled stably. The shape, the depth and the like of the concave portions 33 and 43 are arbitrary unless they interfere with the practice of the present invention, and they may be determined according to the shape of the rake face region 2, the grooving conditions and the like.

Since the projections 31 and 32 and the projections 40 to 42 are formed continuously, the chips can be moved smoothly among the projections, thereby having excellent chip discharge property, as is the case with the foregoing preferred embodiment. Otherwise, the configuration is identical to that described in the forgoing preferred embodiment, and the description thereof is omitted.

Although the present invention will be described in detail based on examples, the present invention is not limited to the following examples.

Example 1

<Manufacturing of Inserts>

The insert 1 having the configuration shown in FIG. 1 as described above was manufactured. Specifically, the insert main body of the insert 1 was composed of coated cemented carbide having a hard thin film coated on the surface of a sintered cemented carbide body. The dimensions of the insert 1 are as follows. As the projection height, the thickness direction dimension from the boundary line between the projection and the rake face to the top portion of the projection (the dimension in the direction substantially perpendicular to the mounting surface of the holder) was measured in the section passing through the top portion of the projection and substantially parallel to the front cutting edge 7 and substantially perpendicular to the rake face. As the major axis length and minor axis length, the maximum dimensions perpendicular to an imaginary symmetrical axis in the plane view were measured, respectively. As the length of the flat surface 4, the dimension along a flat surface from the front cutting edge 7 to the tip end of the first projection 10 was measured. As the rake face region 2, the dimension from the front cutting edge 7 to the front end portion of the clamp face region 3, in the plane view, was measured.

The length of the front cutting edge 7: 3.00 mm
The first projection 10:
Height: 0.21 mm
Major axis length: 0.72 mm
Minor axis length: 0.53 mm
The second projection 11:
Height: 0.27 mm
Major axis length: 0.88 mm
Minor axis length: 0.65 mm
The third projection 12:
Height: 0.29 mm
Major axis length: 0.76 mm
Minor axis length: 0.51 mm
The radius of curvature (R) of the imaginary circular arc C: 1.6 mm
The length of the flat surface 4: 0.19 mm in the length from the front cutting edge 7 to the first projection 10
The rake face region 2: 3.05 mm in the length from the front cutting edge 7 to the clamp face region 3

<Evaluation of Internal Turning>

The insert 1 manufactured above was mounted on a holder for internal turning. That is, a clamp screw was inserted into the through-hole 50 of the insert 1, and the tip end of the clamp screw was engaged into a screw hole formed at an insert mounting seat of the holder for internal turning, so that the front cutting edge 7 and the lateral cutting edge 8 of the insert 1 project from the holder toward one side. Then, the insert 1 was used to perform internal turning, and the chip discharge property and the discharged chip forms were evaluated. The internal turning conditions and the individual evaluation methods are as follows, and the results are shown together in Table 1.

(Internal Turning Conditions)
Work material: SCM435
Cutting speed: 100 m/min
Feed: 0.1 mm/rev
Depth of cut: 2.0 mm (Chip Discharge Property)

The evaluation was made by visually observing the state of the internal turning. Evaluation criteria were set as follows.

Symbol "○" indicates that the chips are discharged without remaining at the ascending portion 2b.

Symbol "×" indicates that the chips remain at the ascending portion 2b and are clogged between the insert 1 and the work material, leading to damage to the machined surface or damage to the insert 1 itself.

(Chip Forms)

The discharged chip forms were evaluated through visual observation thereof. The evaluation criteria thereof were set as follows.

Symbol "○" indicates the coil-shaped chip 60 having a small winding number as shown in FIG. 10.

Symbol "×" indicates the coil-shaped chip having a large winding number.

Comparative Example 1

An insert was manufactured in the same manner as in Example 1, except that none of the first to third projections 10 to 12 were located. This insert was used to perform the internal turning in the same manner as in Example 1, and the chip discharge property and the discharged chip forms were evaluated. The results are shown together in Table 1.

TABLE 1

| | Existence of three types of specific projections on the rake face region | Results of evaluation of internal turning | |
|---|---|---|---|
| | | Chip discharge property | Chip forms |
| Example 1 | Existence | ○ | ○ |
| Comparative Example 1 | Nonexistence | X | X |

As apparent from Table 1, it can be seen that the insert 1 of Example 1 is superior to the insert of Comparative Example 1 in chip discharge property.

Example 2

Figure 19:
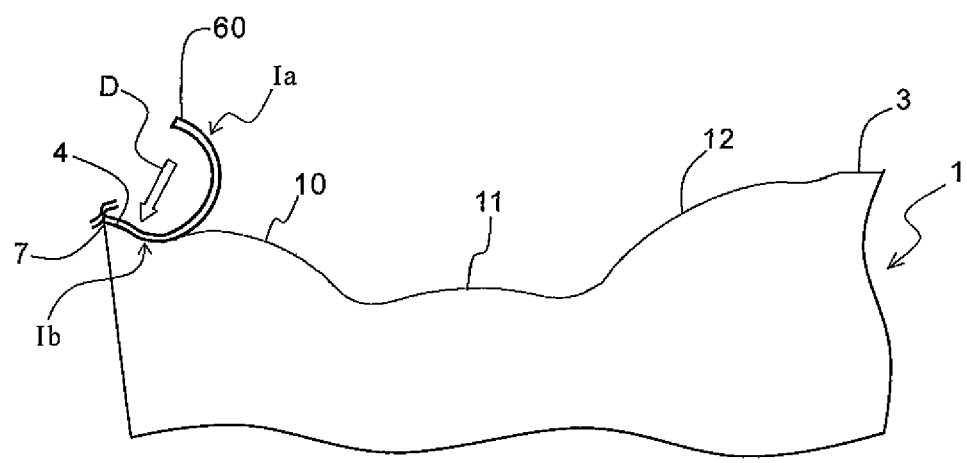
FIG. 19 is a schematic explanatory drawing showing the evaluation method in Example 2.

The insert 1 of Example 1 was used to evaluate the influence of the first projection 10 on the section of the chip 60. Specifically, as shown in FIG. 19, the evaluation was made by visually observing a plurality of sections of the generated chip 60. As a result, it was found that the section at a specific point had a characteristic sectional shape, and the sections at other points had a similar shape.

Figure 20:
FIGS. 20(a) and (b) are schematic sectional views showing the evaluation results in Example 2, respectively.
Figure 20:
Figure 21:
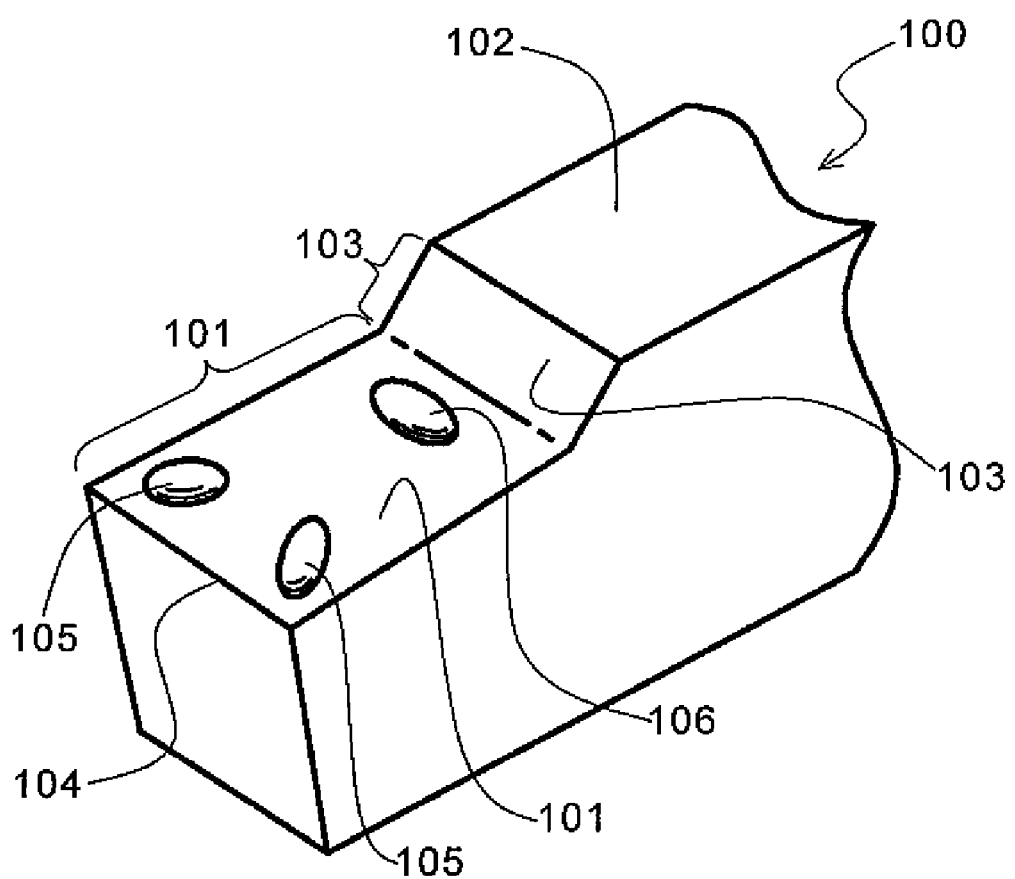
FIG. 21 is a partially enlarged schematic perspective view showing the neighborhood of one end of a related art cutting insert.

In FIG. 19, the point corresponding to the point having the similar sectional shape is plotted as Ia, and the specific point is plotted as Ib. The results thereof are shown in FIGS. 20(*a*) and (*b*). FIG. 20(*a*) shows the section of the chip 60 at the Ia in FIG. 19, and FIG. 20(*b*) shows the section of the chip 60 at the Ib in FIG. 19. The Ib having the characteristic sectional shape was 1 mm apart from the tip end of the chip 60.

As apparent from FIGS. 20(*a*) and (*b*), it can be seen that the section of the chip 60 is transformed from the section shown in FIG. 20(*a*) to the section shown in FIG. 20(*b*). From this result, it is estimated that the chip 60 is compressed over the region from the Ia to the Ib in the direction of an arrow D shown in FIG. 19, thereby increasing the hardness of the chip 60. That is, it is estimated that the chip 60 is flatten by being subjected to strong compressive stress over the region from the Ia to the Ib, and pressed against the flat surface 4, and such large work hardening action is received by the projection 10, finally producing the coil-shaped chip 60 having a small winding number as shown in FIG. 10. That is, the chips can be suitably subjected to work hardening and curling, and then discharged by having the above-mentioned first to third projections 10 to 12, and having the flat surface 4.

While the several preferred embodiments of the present invention have been described above, the present invention is not limited to these preferred embodiments. It is apparent that changes and improvements may be made without departing from the gist of the present invention. For example, though in the foregoing preferred embodiment, the single projection 12 is located at the ascending portion 2*b*, other projection may be located on the left and right of the projection 12.

In the preferred embodiment, the case where the three types of projections are arranged so as to have tangent points to the imaginary circular arc of a concentric circle respectively has been illustrated. Without limiting to this, four types or five types, namely, three types or more may be located. These configurations enable a smooth chip flow among the projections, which are therefore especially suitable for the insert having a large amount of projection from the holder.

The embodiment that only the projections arranged so as to have tangent points to the imaginary circular arc of the concentric circle respectively are located on the rake face region has been illustrated. Without limiting to this, any projection not having a tangent point to the imaginary circular arc of the concentric circle may be further arranged depending on the insert size and the insert shape such as the presence and absence of a hand.

The embodiment having the clamp method in which a screw is inserted into the through-hole 50 of the insert 1 and screwed into the holder 52 has been illustrated. Without limiting to this, the embodiments having the clamp-on method or lever lock method may be employed. There has been illustrated a 180-degree rotationally symmetrical shape with respect to the central axis of the through-hole 50. Without limiting to this, it is applicable to any shape such as a double sided insert and a 120-degree rotationally symmetrical shape. In cases where the upper surface is not directly clamped by a clamp member or the like when mounting on the holder, such as a 120-degree symmetrical shape with respect to a line substantially parallel to the rake face region, the surface that is brought into contact with the holder and clamped (the surface restricted by the holder) can be used as the above-mentioned clamp face region.

Although in the foregoing preferred embodiment, one in which the rake face 2*a* and the ascending portion 2*b* are formed so as to firstly descend and then ascend from the front cutting edge 7 toward the clamp face region 3 has been illustrated, for example, the rake face 2*a* may be a face having a positive or negative rake angle.

Alternatively, the substantially semi-ellipsoidal first to third projections 10 to 12 may be eccentric. In order to achieve a point contact between the chips and projections, they may have a substantial circle, namely a substantially semispherical shape in the plane view. The shapes of the first to third projections 10 to 12 are not limited to them, or alternatively, they may be polygonal-pyramid-like trapezoids such as triangular-pyramid-like trapezoid and square-pyramid-like trapezoid, cone-like trapezoid, ellipsoidal-pyramid-like trapezoid, or the like. The top faces thereof comprise preferably formed by a curved face in order to decrease the frictional resistance among the projections and the chips.

Although in the foregoing preferred embodiment, in the plane view, the angle α between the major axes of the pair of the projections in the first projection 10 and 10 is smaller than the angle β between the major axes of the pair of the projections in the second projection 11 and 11, the locations where the first and second projections 10 and 11 are arranged are not limited thereto. For example, they may be arranged so that the major axis direction of the ellipsoid of the second projection 11 is parallel to the major axis direction of the ellipsoid of the first projection 10. Alternatively, they may be located so that the major axes of the pair of the first projections 10 and 10 are parallel to each other, or that the major axes of the pair of the second projections 11 and 11 are parallel to each other.

Especially, it is preferable that the first projections 10 are of substantially semispherical shape arranged on the rake face 2*a* so that the major axis of the ellipsoid is directed to the chip flow direction, namely the minor axis of the ellipsoid is directed to the chip width direction. Thus, the chips can be greatly deformed by the first projections 10, and the work hardening can be increased. As a result, the chips are further liable to be broken and cut, thereby improving the chip discharge property.

On the other hand, in the above-mentioned other preferred embodiment, the pair of the first projections 15*a* and 15*b* are located so that the top portion $t_{15a}$ of the projection 15*a* is higher than the top portion $t_{15b}$ of the projection 15*b*. Alternatively, the projections 15*a* and 15*b* may be located so that their respective top portions have the same height. Similarly, the pair of the second projections 16*a* and 16*b* are located so that the top portion $t_{16a}$ of the projection 16*a* is higher than the top portion $t_{16b}$ of the projection 16*b*. Alternatively, the projections 16*a* and 16*b* may be located so that their respective top portions have the same height.

Examples of combinations of the heights of the top portions of the individual projections include (i) the top portion of the projection 15*a*>the top portion of the projection 15*b*, and the top portion of the projection 16*a*=the top portion of the projection 16*b*, (ii) the top portion of the projection 15*a*>the top portion of the projection 15*b*, and the top portion of the projection 16*a*>the top portion of the projection 16*b*, (iii) the top portion of the projection 15*a*=the top portion of the projection 15*b*, and the top portion of the projection 16*a*>the top portion of the projection 16*b*, and (iv) the top portion of the projection 15*a*=the top portion of the projection 15*b*, and the top portion of the projection 16*a*=the top portion of the projection 16*b*. Particularly, the combination (ii) is preferable. Without limiting to this, one may be selected arbitrarily from these combinations (i) to (iv), depending on the purpose.

The present invention is not limited to the individual inserts according to the forgoing preferred embodiments. For example, the present invention may be an insert according to a preferred embodiment as a combination of the insert according to the preferred embodiment (FIG. 1 to FIG. 5) and the insert according to the other preferred embodiment (FIG. 11 and FIG. 12).

The invention claimed is:

1. A cutting insert comprising a rake face region located on an upper surface, a flank located on a front surface, and a cutting edge located at an intersection between the rake face region and the flank, wherein
   at least three types of projections having different distances from the cutting edge are located on the rake face region, and when the three types of projections are represented by a first projection, a second projection and a third projection in the order of their increasing distance from the cutting edge, the top portion of the second projection is located lower than an imaginary straight line connecting the top portion of the first projection and the top portion of the third projection in the side view, and wherein
   a clamp face region clamped by a holder is further located on the upper surface, and in the plane view, the rake face region and the clamp face region are arranged in this order from the cutting edge, and
   the rake face region comprises a edge closer to the clamp face region, and the edge of the rake face region inclines so as to have an increasing distance from the cutting edge, from one end of the cutting edge toward the other end of the cutting edge, in the plane view.

2. The cutting insert according to claim 1, wherein the first projection, the second projection and the third projection have tangent points to an imaginary circular arc in the side view, respectively.

3. The cutting insert according to claim 1, wherein the first projection comprises a pair of projections arranged laterally on the rake face region in the front view.

4. The cutting insert according to claim 1, wherein the rake angle of the rake face region increases from one end of the cutting edge toward the other end of the cutting edge.

5. The cutting insert according to claim 1, wherein the rake face region has a rake face and an ascending portion inclines upward in the direction away from the cutting edge, and at least the third projection is located at the ascending portion.

6. A cutting tool for grooving, comprising the cutting insert according to claim 1 mounted on a holder.

7. A method of cutting a work material comprising:
   rotating a work material;
   cutting the work material by bringing the cutting edge of the cutting tool according to claim 6 into contact with the work material; and
   separating the cutting tool from the work material.

8. A cutting insert comprising a rake face region located on an upper surface, a flank located on a front surface, and a cutting edge located at an intersection between the rake face region and the flank, wherein
   at least three types of projections having different distances from the cutting edge are located on the rake face region, and when the three types of projections are represented by a first projection, a second projection and a third projection in the order of their increasing distance from the cutting edge, the top portion of the second projection is located lower than an imaginary straight line connecting the top portion of the first projection and the top portion of the third projection in the side view,
   wherein the rake face region has a rake face and an ascending portion inclines upward in the direction away from the cutting edge, and at least the third projection is located at the ascending portion, and
   wherein the third projection comprises a projection located at substantially the central position of the ascending portion.

9. The cutting insert according to claim 8, wherein the first projection, the second projection and the third projection have tangent points to an imaginary circular arc in the side view, respectively.

10. The cutting insert according to claim 9, wherein
    the rake face region comprises a flat portion interposed between the cutting edge and the first projection, and
    when a tangent point of the first projection with the imaginary circular arc is represented by "a", the "a" is within a range of one third from the cutting edge in the dimension of the rake face region in a direction substantially perpendicular to the cutting edge in the plane view.

11. The cutting insert according to claim 8, wherein the first projection comprises a pair of projections arranged laterally on the rake face region in the front view.

12. The cutting insert according to claim 11, wherein the first projections are located so that the top portion of the projection adjacent to one end of the cutting edge is higher than or equal to the top portion of the projection adjacent to the other end of the cutting edge.

13. The cutting insert according to claim 11, wherein the second projection comprises a pair of projections arranged laterally on the rake face region in the front view.

14. The cutting insert according to claim 8, wherein the rake angle of the rake face region increases from one end of the cutting edge toward the other end of the cutting edge.

15. A cutting tool for grooving, comprising the cutting insert according to claim 8 mounted on a holder.

16. A method of cutting a work material comprising:
    rotating a work material;
    cutting the work material by bringing the cutting edge of the cutting tool according to claim 15 into contact with the work material; and
    separating the cutting tool from the work material.

17. A cutting insert comprising a rake face region located on an upper surface, a flank located on a front surface, and a cutting edge located at an intersection between the rake face region and the flank, wherein
    at least three types of projections having different distances from the cutting edge are located on the rake face region, and when the three types of projections are represented by a first projection, a second projection and a third projection in the order of their increasing distance from the cutting edge, the top portion of the second projection is located lower than an imaginary straight line connecting the top portion of the first projection and the top portion of the third projection in the side view, and
    wherein a concave portion is located at a region between the cutting edge and the third projection.

18. The cutting insert according to claim 17, wherein the first projection, the second projection and the third projection have tangent points to an imaginary circular arc in the side view, respectively.

19. The cutting insert according to claim 17, wherein the first projection comprises a pair of projections arranged laterally on the rake face region in the front view.

20. The cutting insert according to claim 17, wherein the rake angle of the rake face region increases from one end of the cutting edge toward the other end of the cutting edge.

21. The cutting insert according to claim 17, wherein the rake face region has a rake face and an ascending portion inclines upward in the direction away from the cutting edge, and at least the third projection is located at the ascending portion.

22. A cutting tool for grooving, comprising the cutting insert according to claim 17 mounted on a holder.

23. A method of cutting a work material comprising:
    rotating a work material;
    cutting the work material by bringing the cutting edge of the cutting tool according to claim 22 into contact with the work material; and
    separating the cutting tool from the work material.

* * * * *